M. J. STEIN.
Improvement in Process and Apparatus for Rendering Fat, &c.
No. 124,983. Patented March 26, 1872.
2 Sheets--Sheet 1.
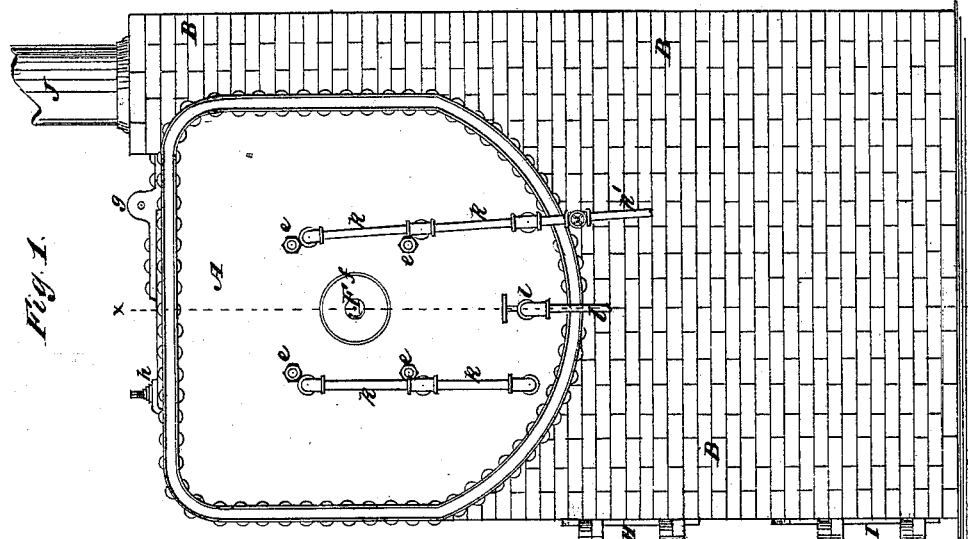
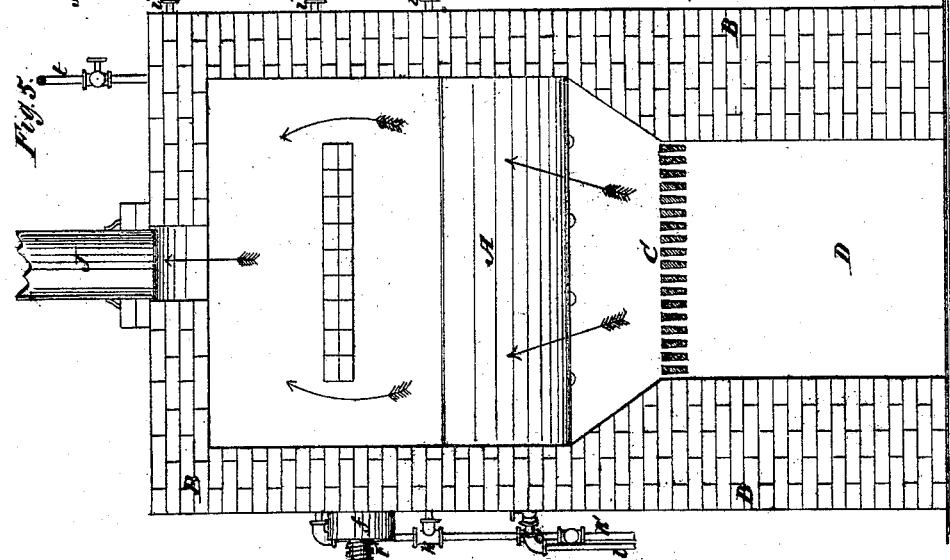

M. J. STEIN.
Improvement in Process and Apparatus for Rendering Fat, &c.
No. 124,983. Patented March 26, 1872.
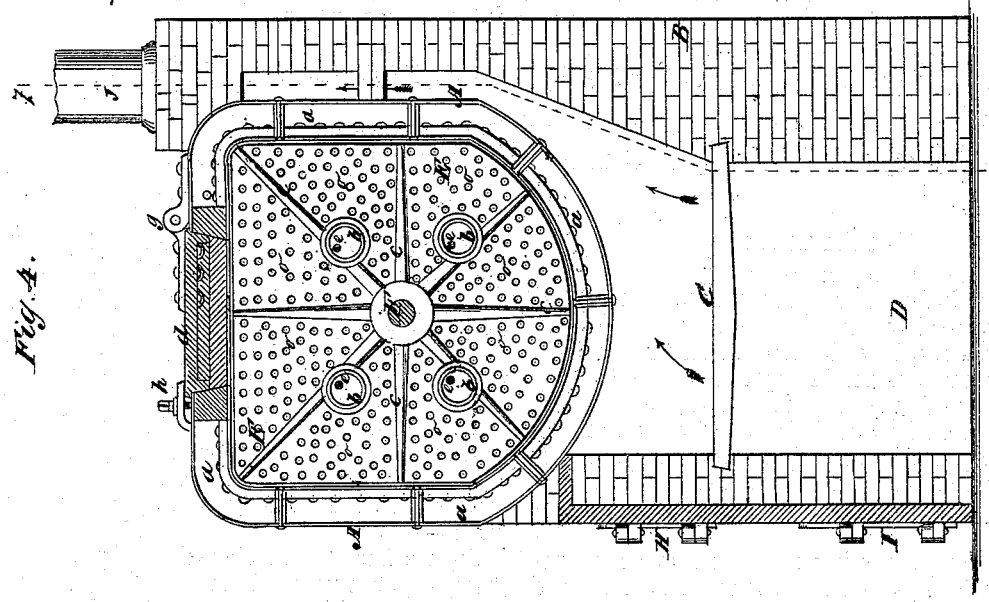
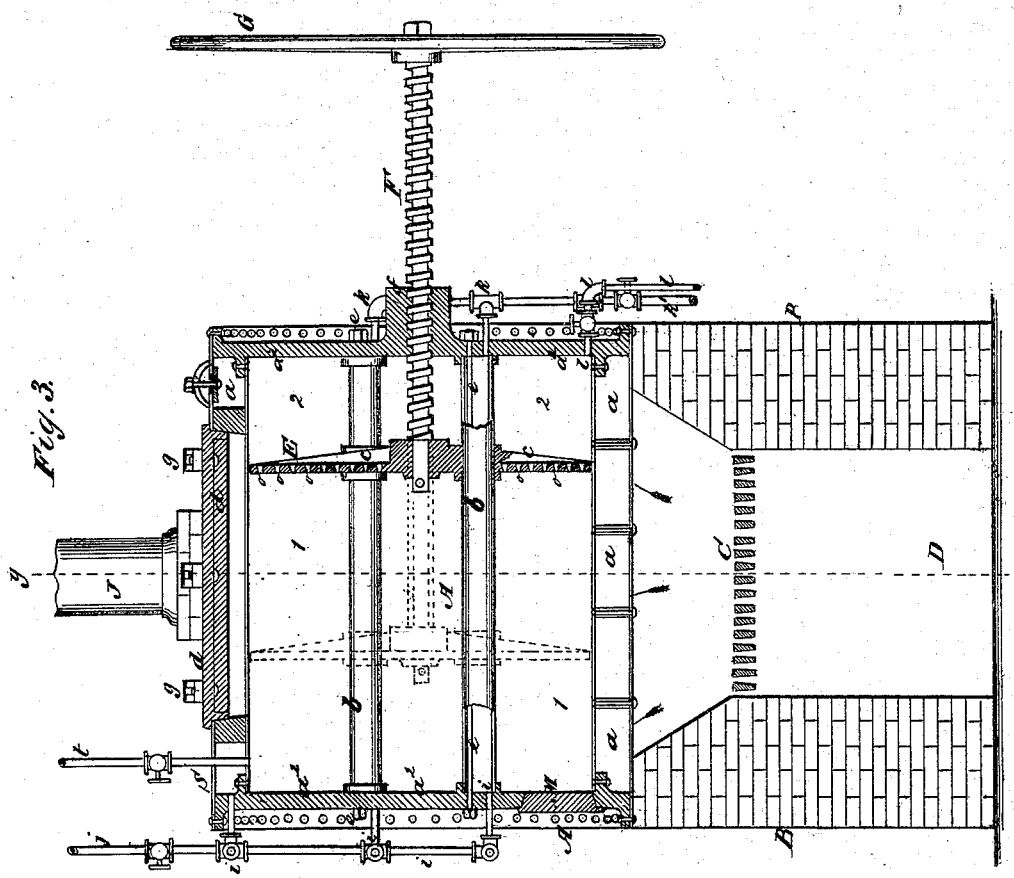

124,983

UNITED STATES PATENT OFFICE.

MICHAEL J. STEIN, OF NEW YORK, N. Y.

IMPROVEMENT IN PROCESSES AND APPARATUS FOR RENDERING FATS, &c.

Specification forming part of Letters Patent No. 124,983, dated March 26, 1872.

SPECIFICATION.

*To all whom it may concern:*

Be it known that I, MICHAEL J. STEIN, of the city of New York, in the county and State of New York, have invented a new and useful improvement in rendering out and extracting from animal matters the contained fat or water, or both; and I do hereby declare the following to be a full, clear, and exact description of the same, reference being had to the accompany drawing forming part of this specification.

Previous to my invention it has been customary, in steam-rendering apparatus for the extraction of the fat from the animal matter, to employ either a process in which the matter to be treated is placed in a suitable closed vessel and therein subjected to a heating operation, by which the fatty portion is melted and rendered out by the action of the heat and the steam generated in the digester, (in a manner well-known,) or a process in which the animal matter is subjected to a cooking or melting operation in opened vessels, and then subjected to a pressing operation to squeeze out any liquid not melted out. To these processes or methods of treatment there are serious objections, among which may be mentioned the impracticability of extracting wholly all the fat and liquid matters, so as to leave the residuum in a dry and solidified condition, which is a great desideratum, the expense and labor consequent to the series of operations and the necessary complication of apparatus. My invention has for its main object to overcome these objections to the heretofore-practiced methods of treatment, and to provide a process and apparatus by means of which the fat and water of solid animal substances or the serum and water from the blood may be extracted, so as to have the residuum in a nearly dry and solid condition; and which, at the same time, can be exceedingly economic both in its working and the cost of the machinery employed. And to these ends my invention consists in subjecting the matter to be treated to both a heating or cooking and a pressing operation, by means of which I am enabled to express the fat and liquid portions from the solid matter as soon as the rendering disintegration and natural separation are effected by the action of the applied heat and the steam generated from the contained water in the matter under treatment, as will hereinafter be more fully explained. And my invention further consists in an apparatus, substantially such as hereinafter described, by which I am enabled to conduct the method of treatment or process just alluded to.

To enable those skilled in the art to fully understand and use my invention, I will proceed to describe more in detail, referring by letters to the accompanying drawing, in which—

Figure 1 is a front elevation, Fig. 2 a back view, Fig. 3 a vertical longitudinal section at the line $x\ x$ Fig. 1, Fig. 4 a vertical cross-section at the line $y\ y$ Fig. 3, and Fig. 5 a vertical section at the line $z\ z$ Fig. 4, of an apparatus such as I propose to use in carrying out my invention.

In the several figures the same part is designated by the same letter of reference.

I will first explain, by reference to the drawing, the construction of the apparatus shown, as a description of its operation will then explain clearly also the nature of my new process or method of treatment.

A is a tank or vessel, generally designated the "digester," which is composed of a shell portion, $a$, of boiler iron and cast-iron heads $a^2$, (see Figs. 3 and 4,) as clearly shown, and which is mounted in the same fashion as a steam-boiler in suitable masonry or brick-work B, embracing the usual fire-chamber and grate C, ash-pit D, doors H I, flues and smoke-pipe or chimney J of an ordinary boiler-furnace. The vessel or digester A is formed with a main door or man-hole, $d$, the plate of which is hinged at $g$, and is securely held when closed (and properly packed) by clamping buttons or dogs $h$ in a well-known manner. At M is a smaller man-hole, and at S may be arranged an ordinary safety-valve. $b\ b\ b\ b$ are four (more or less may be employed) tubes extending from one head, $a^2$, to the other of the digester, and secured by flanges on the inside of the head, into which the tubes are fitted. These tubes or pipes are supplied with steam from pipes $i$, leading from the upper portion of the shell $a$ to one end of each of them, and are connected at their other ends to pipes $k$, which communicate with the lower portion or water-space of said shell $a$. Within the digester A is arranged, to move freely, a perforated platen or face-plate, E, which is formed with large holes to accommodate the four tubes b, as clearly shown, and with numerous small conically-shaped holes, o o, &c., for the purposes to be presently explained. This plate or platen E is formed with suitable ribs to afford combined strength and lightness, and is provided with a screw-shaft, F, that passes through one of the heads of the digester, and is provided with a hand-wrench or wheel, by which it is turned. The head, through which this screw-shaft passes, is formed with a hub, f, at its center, in which is cut the nut or female screw, in which said shaft F works. l is a pipe through which the liquid contents of the digester are drawn off. The dotted lines at Fig. 3 illustrate the platen E moved forward or advanced to another position, and in the sectional view, Fig. 4, the platen is supposed to be in this position. c c, &c., are tie-rods, which pass through the tubes b from head to head of the digester; these rods should be arranged near the uppermost part of the circumference of each tube b, and they have to serve to strengthen the whole structure of the digester. The pipe i is extended upward at j, and provided with a suitable cock, through which the steam in the shell a may be allowed to exhaust when desirable; and the pipe k is extended downward at k' to allow the escape, through a suitable cock, of the water contained in the shell a, when desired. The branch pipes from k, which enter the tubes b, should, of course, be led into the latter close to the lowest part of their circumference to facilitate the emptying of the said tubes of any condensed steam. The tubes b and the shell a may be provided with an ordinary steam-gauge to indicate, and from which the operator may regulate, the steam to the requisite degree of pressure or temperature. The minor details of constuction will be sufficiently clear to the skilled engineer and constructor without further explanation.

The operation of the apparatus, as well as the nature of the process to be therein conducted, will be understood from the following description, viz.: The platen E being drawn back close to the head of the digester, (the head in which screw F works,) and the door or lid of man-hole d opened, the digester or vessel A is charged with the animal matter to be heated. The man-hole plate d is then closed, and the contents of the digester subjected to the action of heat to perform the cooking or melting operation. The products of combination passing up, under, and partially around the shell a, as indicated by the arrows, the water in the lower portion of said shell is generated into steam, and the shell a is heated up to the requisite temperature to effect the rendering out or meltings of the fatty portions of the materials contained in A; and, at the same time, any moisture or water contained in said material is, by the applied heat, converted into steam, which assists the rendering process.

As soon as the cooking or melting process has progressed sufficiently, the platen E is advanced by turning the wrench or hand-wheel G, or is moved up toward or against the charge of material to press or squeeze the mass and force out the contained liquid. At the same time the cock in exit-pipe l is opened, and the liquid fat which is forced out of the charge, and which passes through the numerous perforations o of plate E, is conducted off to suitable coolers in the usual manner. As the platen E is advanced toward and presses upon the contained charge, the interior of the digester is provided by said perforated plate into two compartments, as illustrated at 1 and 2, Fig. 3; and, as the rendering process goes on toward completion, the pressing operation is commenced by gradually, either with a constant or intermittent motion, feeding forward or advancing the platen E against the solid mass of material. As the rendering or melting-out process is facilitated by the disintegrating or cutting-up tendency of the live steam generated within the digester, (from the water contained in the charge,) it is advisable to permit a thorough disintegration and rendering to occur before the charge is pressed much; but when the rendering or forcing out of the fat has been pretty thoroughly effected, with the follower slightly advanced, it may be forced forward with greater expedition and power until the charge has had all the liquid matter expressed, and the scrap may then be discharged in as perfectly dry a condition as is practicable.

In the treatment of animal blood the operation of the apparatus is about the same as just explained in connection with the process of treating solid animal matter. The digester having been similarly discharged, its platen drawn back, and the man-holes closed, the contents are subjected to the action of the steam-heat until the blood shall have become thoroughly coagulated, when the platen E is screwed forward and the charge subjected to the necessary compression to effect the pressing out of all the water, which passes through the platen and is discharged through the pipe l. By the conjoint action of the steam, heat, and expressing apparatus all the water may be expelled from the charge, which charge is then forced out or discharged through the man-hole at M.

It will be understood that by any new process or method of cooking or melting out the fat and generating the constitutional water into vapor or steam, and, at the same time, while the charge is subjected to heat, performing the pressing operation, I am enabled to much more thoroughly and economically extract all the fat and water from the material treated, and can also produce a drier "scrap" or residuum, which, as is well known to those skilled in the art, is a great desideratum. And it will also be understood that the great advantages gained by this new process or method of treatment in extracting the fat and water from animal matters and reducing the residuum to "scrap," (most valuable and best suited for making fertilizers, &c.,) may be employed successfully without following exactly the described apparatus I have shown, and which forms the subject of part of the claims of this application.

The apparatus which I have shown and described, it will be seen, is a very simple and efficient one for carrying on the described process, though other machinery may be devised, or that shown improved upon.

The arrangement of the pipes $i$ and $k$ it will be seen is such that the steam supplied to the tubes $b$ is taken from the upper part of the steam-space of shell $a$, passes through all four of the tubes $b$, and thence into the lower (water-space) portion of the shell $a$. By this arrangement of the pipes $i$ and $k$ with the tubes $b$, (which are not connected with the boiler except by the pipes $i$ $k$,) constant circulation of the steam is kept up, and by the action of the tubes $b$ the thorough and economical heating of the charge is effected.

The number of tubes $b$ may be varied and other changes of detail may be made without departing from that part of my invention which relates to the apparatus employed.

Having now explained the several parts of my invention sufficiently to enable one skilled to make the necessary apparatus and work the process, what I claim as new, and desire to secure by Letters Patent, is—

1. In the process of extracting the fat and water or other liquids from animal matters, subjecting the material to both heat and pressure, substantially as and for the purposes set forth.

2. In an apparatus for rendering and pressing the material, the combination, with a digester, of a platen, E, or its equivalent, and suitable means for operating it, whereby the cooking and pressing may be effected, substantially as described.

3. In combination with the vessel A, a perforated movable plate, E, and a suitable exit-pipe, $l$, arranged as described, whereby the solid and liquid matters are separated into separate compartments, from which they may be separately discharged, as set forth.

4. In combination with the digester A composed of the steam-shell or jacket and solid heads, separate internal tubes $b$, and pipes for supplying steam to said tubes from the steam-space of the shell, substantially as set forth.

5. The arrangement of the pipes $i$ and $k$ with the steam-shell $a$ and tubes $b$, in the manner specified, so as to effect a constant circulation in the steam and water spaces, substantially as set forth.

MICHAEL J. STEIN. [L. S.]

In presence of—
 GEO. A. GREENSWARD,
 J. FELBEL.